Nov. 19, 1968 L. A. FROHBACH ET AL 3,411,978

PRESSURE SENSITIVE ADHESIVE MAKER

Filed Dec. 31, 1964 2 Sheets-Sheet 1

INVENTORS

Louis A. Frohbach

Edwin C. Addis by Ervin B. Steinberg

Nov. 19, 1968 L. A. FROHBACH ET AL 3,411,978

PRESSURE SENSITIVE ADHESIVE MAKER

Filed Dec. 31, 1964 2 Sheets-Sheet 2

INVENTORS.
LOUIS A. FROHBACH
EDWIN C. ADDIS
BY

Ervin B. Steinberg

United States Patent Office 3,411,978

Patented Nov. 19, 1968

3,411,978

PRESSURE SENSITIVE ADHESIVE MARKER

Louis A. Frohbach and Edwin C. Addis, Florence, Mass., assignors, by mesne assignments, to Avery Products Corporation, San Marino, Calif., a corporation of California Continuation-in-part of application Ser. No. 381,988, July 13, 1964. This application Dec. 31, 1964, Ser. No. 425,106

5 Claims. (Cl. 161—145)

ABSTRACT OF THE DISCLOSURE

A pressure sensitive adhesive marker assembly comprises a flexible strip of material having a pressure sensitive adhensive coating at its underside and is manipulated by means of an overlying mask to which the marker is adhesively fastened. One edge of the marker is releasably adhered to the underside of the mask while the opposite edge of the marker is free of such adherence with the mask, thus providing for adherence or stripping of the marker with regard to an underlying surface, depending upon which end of the mask is manipulated. In one of the embodiments two markers are assembled on each other in the described manner, the upper marker serving also as a mask for the lower mask.

This application is a continuation-in-part application of copending application for U.S. Letters Patent Ser. No. 381,988, filed July 13, 1964, now abandoned.

This invention is related to markers and tabs and has particular reference to pressure sensitive adhesive markers or tabs which are applied to surfaces for marking, for identification, for masking or similar purposes.

More specifically, this invention concerns a transferable pressure sensitive adhesive marker or tab which during storage and transfer is protected by a mask and wherein said mask is used for manipulating the marker, for accurately indexing and positioning the marker, and for adhering the marker upon another surface by automated methods.

One of the principal objects of this invention is, therefore, the provision of a transferable marker or tab having a pressure sensitive adhesive surface.

Another object of this invention is the provision of a marker having a pressure sensitive adhesively coated underside which is not touched by human hands during the affixing of the marker to another surface.

Another object of this invention is the provision of a marker which can be transferred by automatic means.

A further object of this invention is the provision of a marker which is provided with a mask whereby the mask provides protection for the marker during storage and during manipulation.

Still another object of this invention is the provision of a pressure sensitive adhesive marker which is equipped with a mask, the mask enabling indexing and application of the marker onto a surface with highest precision and by the use of automatic machinery.

Another and further object of this invention is the provision of a marker assembly having a removable mask, the mask being provided for protective and manipulative purposes.

Another and still further object of this invention is the provision of a marker or tab assembly so constructed that it may be adhesively adhered upon a surface, yet remains strippable therefrom upon lifting the assembly starting at a specially constructed edge of the assembly.

Still other and further objects of this invention will be more clearly apparent by reference to the following description when taken in conjunction with the accompanying drawings, in which.

Figure 1:
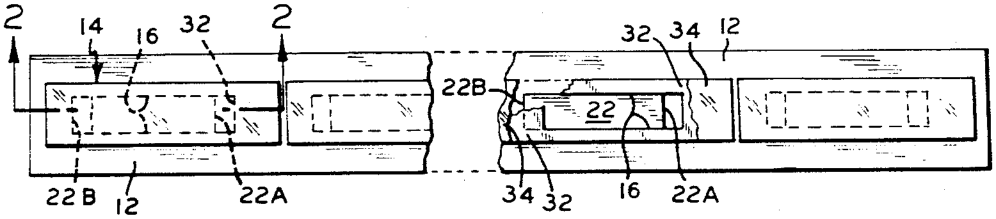
FIGURE 1 is a plan view of a supply of markers assembled in strip form according to one of the embodiments of this invention.
Figures 2, 3, 4, 5, 6, 7:
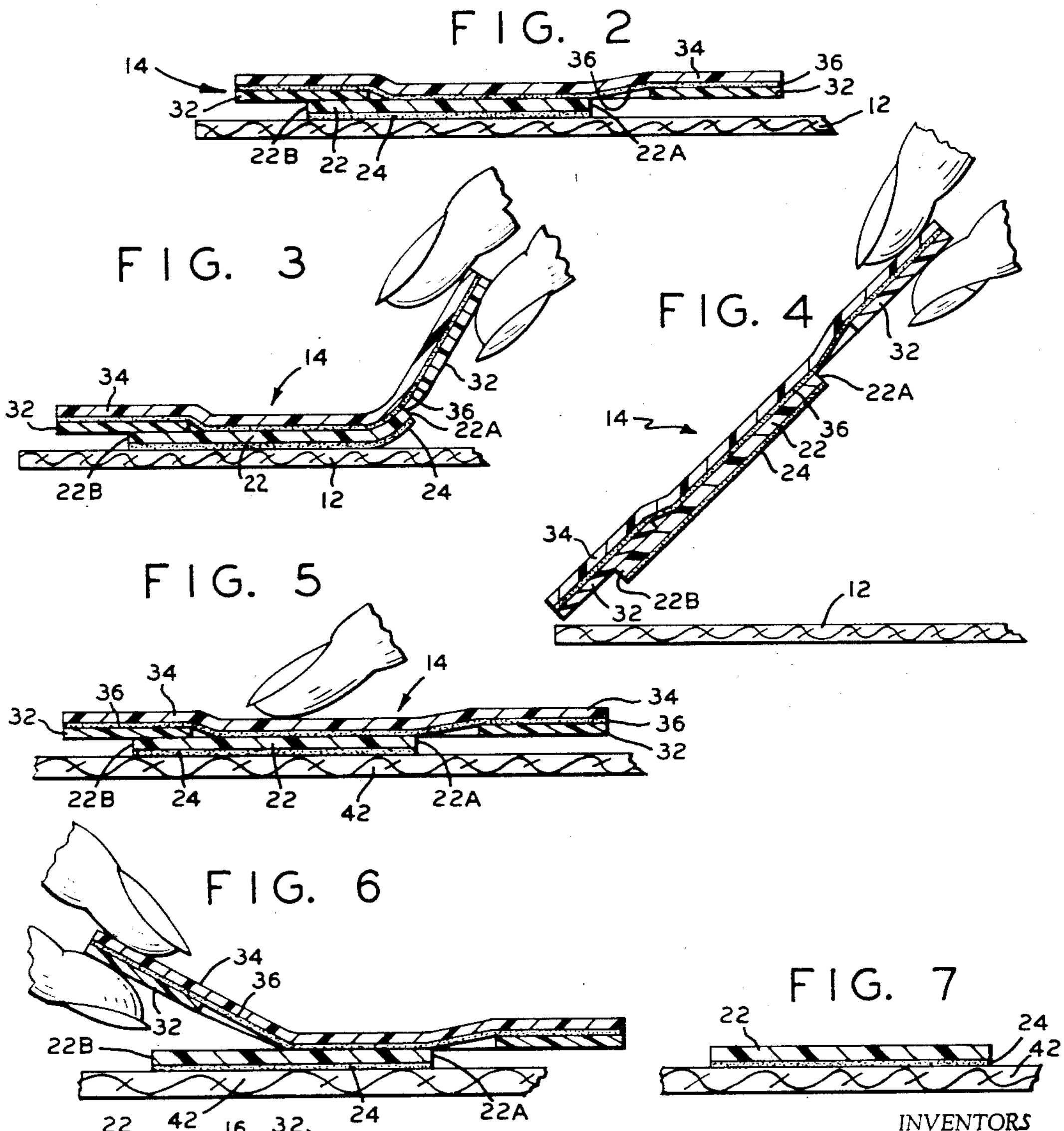
FIGURE 2 is a sectional view along lines 2—2 in FIGURE 1, the view being in an enlarged scale in order to more clearly illustrate the various elements.
FIGURE 3 is an elevational view illustrating the procedure of removing one marker assembly from its base material.
FIGURE 4 is a view, similar to FIGURE 3, showing the marker assembly removed from the base material.
FIGURE 5 is an elevational view which illustrates the transfer and adhering of the marker upon another surface.
FIGURE 6 is a vertical view illustrating the procedure of removing the mask from the marker while the marker remains adhesively affixed to the surface.
FIGURE 7 is an elevational view of the marker adhered to the surface and the mask completely removed from the marker.

Referring now to the figures and FIGURES 1 and 2 in particular, there is shown a strip of base material 12 which has relatively high release properties. Material of this kind comprises, for instance, a commercial paper provided with a silicone release coating. Along the top surface of this base material there is disposed a plurality of marker and mask assemblies 14. Each of these assemblies comprises a marker strip 22, the underside of which is coated with a pressure sensitive adhesive coating 24. Due to the fact that the base material 12 has high release properties, there is relatively little adhesion between the base material 12 and the underside of the marker 22. Hence, the marker can readily be lifted off the base material without impairment of the adhesive coating 24, and the marker transferred onto another surface to which it is to adhere in a more or less permanent manner.

The marker 22 is made of suitable material which is readily visible, or which can be provided with indicia or symbols. Coated stock is particularly suited.

A protective mask is superposed on each of the markers. Each such mask comprises a strip of material 32 which is somewhat larger than the marker. The mask is provided with a rectangular aperture 16. A strip 34 of clear acetate, or cellophane, or similar material, the underside of which is coated with a layer 36 of pressure sensitive adhesive material, overlies the mask material and, particularly, the area occupied by the aperture 16. The adhesive layer 36 bonds the mask material 32 to the strip 34 and at the area of the aperture 16 provides an adhesive bond with the marker material 22. In the preferred embodiment, the marker 22 is of the same size as the aperture 16 and, hence, the marker and the mask can be made of the same material, the selvage being used for the mask. Also, the mask and the superposed tape material are of the same over-all dimension, being die cut after assembling to one another. It shall be clearly understood however, that other combinations of size and materials may be used without deviation from the concept of this disclosure.

The materials are selected in such a manner that the adhesive bond between the layer 36 and the top side of the mask 22 is only slightly stronger than the bond between the adhesive underside of the marker and the base material 12.

One of the salient features of this invention resides in the positioning of the marker relative to the mask, the marker being offset relative to the aperture of the mask. As clearly seen in FIGURE 2, the right hand edge 22A of the marker is disposed between the base material 12 and the adhesive layer 36 which reaches through the mask aperture 16. The opposite marker edge 22B is disposed between the base material 12 and the mask material 32. Thus, the marker edge 22A is in contact with the adhesive layer 36 and adhered thereto, while the opposite marker edge 22B is disposed between two non-adhesive surfaces and, therefore, free of adhesive attachment.

The use of this marker assembly is seen best by reference to FIGURES 3 to 7.

In order to transer the marker and applying it to another surface, the user grasps the mask at the mask end which is closest to the marker edge 22A, the edge which is adhered to the underside of the mask. Since there is relatively little adhesive bonding between the base material 12 and the marker underside, the marker remains adhesively fastened to the adhesive coating 36 of the mask. Thus, as the mask is lifted off the base material, the marker remains adhered to the underside of the mask, as is clearly seen in FIGURE 4.

The user now holds a mask with a marker adhered thereto, the marker being visible through the clear pressure sensitive adhesive tape overlying the aperture 16.

The marker now can be positioned accurately opposite the desired location on a surface 42 and brought in contact therewith by lowering the mask and marker underside thereupon. By applying relatively light pressure through the mask upon the area of contact between the surface 42 and the adhesive underside 24 of the marker 22, the marker is adhered to the surface 42 as clearly seen in FIGURE 5. Next, the user grasps the mask edge which is closest to the marker edge 22B, that is, the marker edge which is not adhesively fastened to the mask, and lifts off the mask, advancing progressively toward the opposite mask edge as shown in FIGURE 6. This leaves the marker transferred and adhesively fastened upon the surface 42, as seen in FIGURE 7.

It shall be noted that the underside of the marker is not touched during the transfer process, that the underside of the marker remains free of the user's finger prints, and that the transfer and affixing of the marker is accomplished with utmost precision, facility and speed. The mask serves as a most convenient vehicle for manipulating the marker while providing simultaneously protection to the marker itself.

One of the alternative embodiments comprises a modification of the mask construction. Instead of an apertured mask material 32 and the use of a superposed pressure sensitive adhesive tape, numerals 34 and 36, the underside of the mask can be provided with a zone of adhesive material, this zone being of the size and at a position of the heretofore shown aperture 16. Alternatively, the mask may comprise transparent tape having a conventional pressure sensitive adhesive coating at its underside, the underside being modified, however, so that the adhesive coating is rendered ineffective by the use of a chemical, except for a zone corresponding substantially to the area of the window 16.

Figure 8:
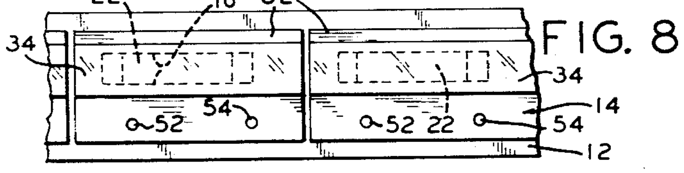
FIGURE 8 is a top plan view showing a variation of the mask construction.

A further modification is shown in FIGURE 8. The mask is widened along one side to provide space for two indexing holes 52 and 54 which serve for machine pick-up of the mask and the marker, and/or for indexing and affixing the marker by automatic machinery. In this way, the marker is applied upon another surface, such as a file folder or an indexing card, with utmost precision, free of manual inaccuracies and variations.

Figure 9:
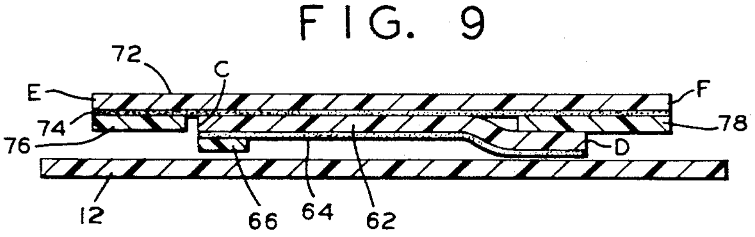
FIGURE 9 is a vertical sectional view of a double marker or tab assembly constituting a further embodiment of this invention.
Figure 10:
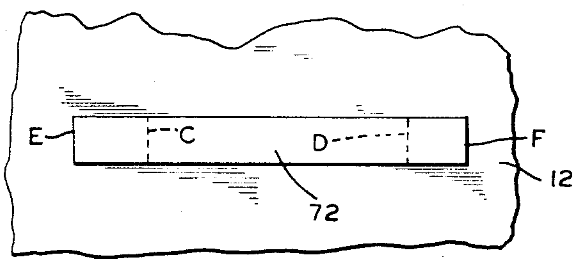
FIGURE 10 is a top plan view of the embodiment per FIGURE 9.

A further alternative design is shown in FIGURES 9 and 10 which depict a double marker or tab. A first rectangular, elongated tab or marker 72 is provided at its underside with a layer of pressure sensitive adhesive coating 74. Preferably, this marker is clear transparent, partially or entirely, but it may also be opaque. The extreme ends of the adhesive coating are rendered ineffective, as for instance, by adhesively fastening thereto respective small tabs of tape, indicated by numerals 76 and 78. The same effect may be achieved, as stated heretofore, by a zoned application of the adhesive material or by a chemical poisoning of the adhesive at the end zones. Thus, there is produced a top marker the underside of which is provided with a median zone having a pressure sensitive adhesive coating and adhesive-free end zones. It may be noted that the non-adhesive portion provided by tab 78 is somewhat longer than the corresponding opposite portion provided by tab 76.

A lower marker is of a similar construction, comprising essentially a marker 62, a pressure sensitive adhesive coating 64 along the underside, and a non-adhesive end portion provided by a piece of tape 66 adhesively held to the coating 64. It may be noted that the lower marker 62 is adhesively coated along its underside and that this coating is rendered ineffective only at one end instead of at both ends as is the case in the upper marker 72. The entire marker assembly, comprising markers 72 and 62, is supported upon a release type base material 12.

The left hand edge C of the lower marker 62 is adhered to the adhesive coating 74 of the upper marker 72, while the right hand edge D is disposed outside said adhesive layer, terminating underneath the tape piece 78 which renders the adhesive coating 74 ineffective at this particular area.

The use of this combination may be visualized as follows: The upper marker is grasped by the user at the end L and peeled from the base material 12. Since the lower marker 62 has its end C adhesively fastened to the upper marker 72, the lower marker remains adhesively fastened to the upper marker while peeling the assembly from the base material, starting at edge E and advancing toward the opposite edge F. Grasping either end E or F of the topmost marker 72, the lower marker 62 is now positioned opposite a selected ink film and brought in contact therewith for transferring one or more characters or symbols. Subsequently, the marker combination is lifted starting at edge E, whereby, as described heretofore, the lower marker remains adhered to the upper marker. The lower marker with characters or symbols affixed thereto is now ready for being adhered to another surface.

In order to detach the lower marker 62 from the upper marker 72 subsequent to it having been adhered to the desired surface, the upper marker is peeled back, starting at edge F and progressively advancing toward edge E. The lower marker 62 can be picked up again at any time from a smooth surface, such as glass and the like, by either peeling it therefrom grasping edge C, or alternatively, by repositioning the top marker 72 on the lower marker assembly and peeling the composite marker assembly, starting once again at edge E of the upper marker.

The above described combination using clear transparent tape for layers 62 and 72 in combination with the transfer of printed characters has been found particularly useful in providing charts and plots which involve the frequent repositioning and regrouping of information, as for instance game pieces, strategic objects, and the like.

What is claimed is:

1. An article of manufacture comprising:

a first marker formed by a first strip of tape material;

the underside of said first strip material being provided with a median zone having a pressure sensitive adhesive coating and a non-adhesive zone at each of two opposite ends;

a second marker formed by a second strip of tape material;

the underside of said second marker being provided with a pressure sensitive adhesive coating and a non-adhesive zone at one end;

said first and said second markers being positioned relative to one another to cause the upper side of said second marker to be juxtaposed on the underside of said first marker, and the respective end of said second marker having said non-adhesive zone at its underside being adhered to the adhesive coating at said median zone, and the opposite end of said second marker terminating outside said median zone.

2. An article of manufacture as set forth in claim 1 wherein said opposite end of said second marker terminates outside said median zone of said first marker and within a non-adhesive zone thereof.

3. An article of manufacture as set forth in claim 1 wherein said first marker and said second marker are transparent tape material.

4. An article of manufacture as set forth in claim 1 wherein said second marker is disposed with its underside on a base material having relatively high release properties.

5. An article of manufacture as set forth in claim 1 wherein the length of said second marker is greater than that of said median zone of said first marker.

References Cited

UNITED STATES PATENTS

| | | | |
|---|---|---|---|
| 2,498,297 | 2/1950 | Rambo et al. | |
| 2,797,801 | 7/1957 | Bishop | 156—257 XR |
| 2,818,168 | 12/1957 | Tobey et al. | 161—406 XR |
| 3,070,482 | 12/1962 | Cunningham | 161—406 XR |
| 3,194,717 | 7/1965 | Albert | 161—406 XR |
| 3,297,507 | 1/1967 | Twomey | 156—249 XR |
| 3,303,080 | 2/1967 | Aguilera | 161—406 XR |

ROBERT F. BURNETT, *Primary Examiner.*

W. POWELL, *Assistant Examiner.*